April 30, 1940.  H. BOHRN ET AL  2,198,757
MEANS FOR DETERMINING COORDINATES
Filed Jan. 28, 1938
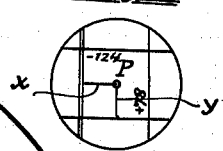
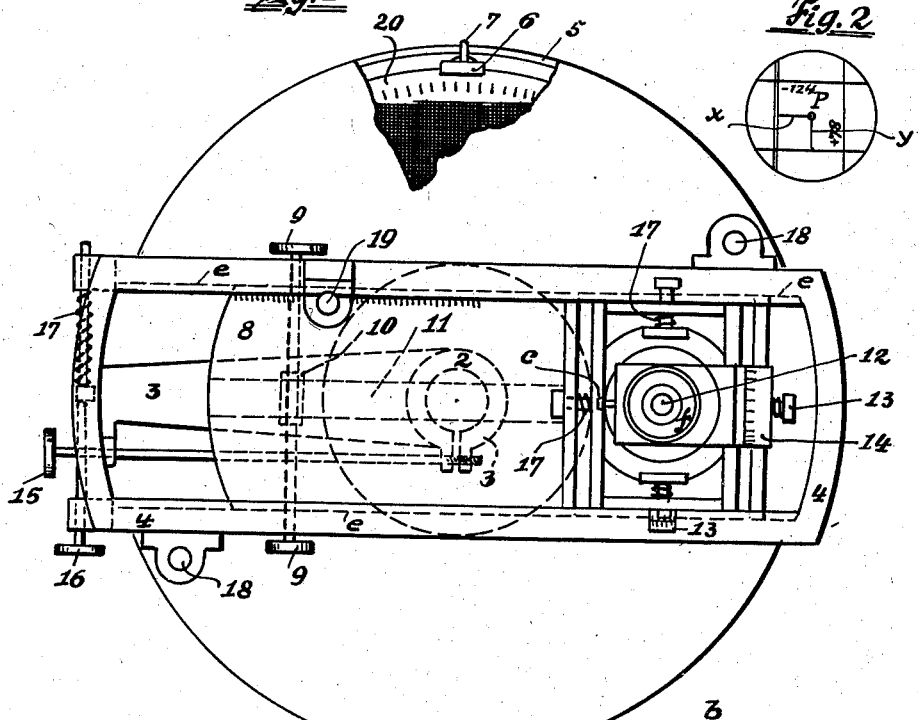
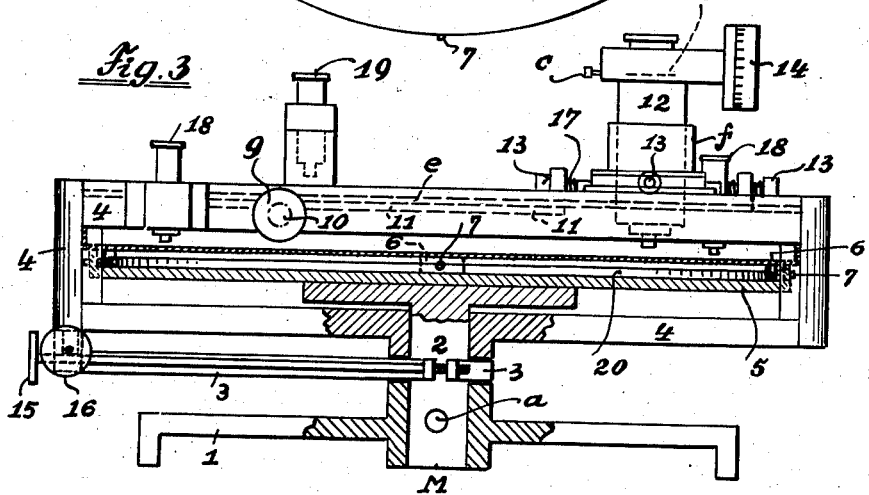
H. Bohrn & L. Avanzini
INVENTORS
By: Glascock Downing & Seebold
Attys.

Patented Apr. 30, 1940

2,198,757

UNITED STATES PATENT OFFICE 2,198,757

MEANS FOR DETERMINING COORDINATES

Hugo Bohrn and Leander Avanzini, Linz, Austria

Application January 28, 1938, Serial No. 187,532
In Austria January 30, 1937

1 Claim. (Cl. 33—1)

This invention relates to means for determining the rectangular coordinates, suitable for charting on a scale greater than 1:5000, of actual points, more particularly of polygon courses and the like, from measurements. The method according to the invention consists in approximately reconstructing the measurements by direct adjustment on precision protractors and length gauges associated with a system of rectangular coordinates, and ascertaining the appropriate rectangular coordinates, with the aid of a network of coordinates by moving generating wheels equipped with enumerating mechanism or the like in fixed relation to the coordinate axes.

Hitherto no method or means have become known enabling rectangular coordinates, suitable for charting or map-making on a scale greater than 1:5000, to be ascertained by the direct setting of precision protractors and precision length gauges to actual surveying measurements with the aid of a network of coordinates or a generating means. The hitherto known instruments for measuring rectangular coordinates from photographic plates or films are, owing to the principle of their construction, not suitable for determining rectangular coordinates by direct adjustment to actual measurements as distinct from photographic pictures. With the aid of the known devices it is possible to find the polar coordinates from given rectangular coordinates on photographs by setting to the rectangular coordinates two slides which are displaceable parallel to a plane and of which the directions of movement are at right angles to each other, while one is equipped with a projection device. The sought-for polar coordinates are then determined with the aid of a receiving surface pervious to light and marked off in degrees and in units of length. To try to find the rectangular coordinates by reversing this procedure only becomes possible (since there is no precision length gauging device provided on the length scale of the light-pervious receiving surface) by bringing the two unknown rectangular coordinates in a laborious trial and error method of approximation into coincidence with a point defined with reference to a polar system, and this can only be done indirectly.

In contrast thereto, in accordance with the apparatus according to the present invention, rectangular coordinates are determined by setting precision protracting and length gauging means directly and immediately (without time-consuming approximating methods) not merely to the polar coordinates but to the actual measurements, i. e. to the actually measured data.

The apparatus or instrument of the invention comprises, in definite relation to a point constituting the origin of a system of rectangular coordinates, one or more precision protractors and precision length gauges, and a network of coordinates or graduation marks of longitude, and/or generating (rolling) members, together with means, associated with the precision adjusting means, for determining the rectangular coordinates, said means allowing of reading off without parallactic error by the avoidance of graduation marks moving one over the other.

Merely for the ascertainment of absolute rectangular coordinate values (signless coordinates) is it known to provide a sheet of paper with a network of lines at right angles to each other on an octant marked off in degrees. This octant is provided with an alidade on which verniers are displaceably and rotatably disposed for the purpose of determining the absolute values of coordinates. However, to avoid parallactic error in reading off, these verniers must bear directly against the square network marking of the octant, and their movement (displacement and rotation) is destructive of any fine graduation marking.

The practice hitherto adopted for determining coordinates for the purpose of making maps to scales greater than 1:5000 is to calculate the rectangular coordinates, with the aid of logarithmic reckoning, from the measurements made in polar coordinates. Calculating machines are used to speed up this work, which can only be carried out by trained experts, but even when such machines are used it is first necessary to ascertain the angular functions from tables. The present apparatus, forming the subject of our invention, serve to enable this work of calculation to be carried out with the requisite degree of accuracy, without previous ascertainment of the angular functions, by the setting of an instrument to the actually measured data.

Forms of construction of the apparatus according to the invention are shown, by way of example, in the accompanying drawing, in which:

Fig. 1 shows a simplified constructional example of apparatus according to the invention, with a network of coordinates, details not essential to an understanding of the invention being omitted.

Fig. 2 gives an example of the image seen in the reading-off instrument.

Fig. 3 is a side elevation of Fig. 1, partly in section.

Referring to Figs. 1 to 3, the axle 2, which carries the plate 5, is rigidly connected to the pedestal 1 by means of the clamping screw a. On this plate 5 there is slidably and rotatably mounted, by means of screws 7 and clamps 6, a glass or metal plate 20 provided with a network of rectangular coordinates and angular graduation marks. The screws 7 may be relatively adjusted to slide the plate 20 in directions at right angles to each other on the plate 5 to center the plate 20 exactly over the axis of the axle 2. The plate 20 may also be rotated about said axis to bring the graduations and scales thereon into any desired position relative to the fixed plate 5.

The mid lines of this network of rectangular coordinates constitute the coordinate axes, and the centre line of the axle 2, passing through M, and which may be vertical or otherwise disposed in space, forms in the point of intersection with the two coordinate axes the origin of the system of coordinates.

Associated with, that is to say in definite relationship to this point of origin there is provided a precision protractor device. This device comprises the angular graduation marks on the plate 20 and the measuring microscopes 18 and 18' revolvable about the axle 2 and guided on the carrier 4. These measuring microscopes 18 and 18' are adjustable for the purpose of correcting errors of orientation in the setting of angles of direction, with the aid of micrometer screws. This adjustment may also be effected with the aid of a micrometer screw which, like the screw c in the case of the screw microscope 12, displaces or rotates the glass plate b with the graduation marks to a measurable extent. The carrier 4 with the microscopes 18 and 18', rotatable about the axle 2, is held fast by means of a setscrew 15 with the aid of a clamp 3, and fixed for the purpose of fine adjustment, with a fine setscrew 16 and counterspring 17.

The precision length gauge contrivance is mounted on the carrier 4, in definite relationship to the point of origin of the system of coordinates, and consists of a slide 8 displaceable in a groove e in the carrier 4, and operable by means of adjusting wheels 9 which actuate a preferably self-arresting pinion 10 meshing with a rack 11.

For the determining of the rectangular coordinates on the network of coordinates there is mounted on the slide 8 a screw microscope 12 rotatable in the tube f. The tube f is capable of being measurably displaced in a vertical direction with the aid of micrometer screws 13 and countersprings 17. A drum 14 pertaining to the screw microscope 12, marked off in a hundred parts and provided if desired with artificial illumination, displaces the glass plate b which is furnished with graduation marks. With the aid of the screw c the glass plate b can be displaced so that the spacing of the marks of the screw microscope 12 tallies with the spacing of the network of coordinates. After the screw microscope 12 has been so adjusted by hand or positively in the tube f that the graduation marks of the screw microscope are parallel to the graduation marks of the network of coordinates an image of the type shown in Fig. 2 is seen in the field of vision of the microscope. Positive adjustment may be effected for instance by means of a gear wheel which is disposed on the stationary axle 2 and which coacts with gear wheels which roll against this wheel and rotate the tube. Provision may also be made to ensure that in the field of vision of the screw microscope, e. g. by means of rotary diaphragms, only one quadrant is free at a time. The coordinate units are given for each square with the sign appropriate to them in the quadrant measured from the coordinate axes, or can be registered with the aid of an auxiliary device which may be disposed on the screw microscope. The fractions of the coordinate units, or also their sign, are given with the aid of the marks on the glass plate b pertaining to the screw microscope 12, while fractions of the coordinate units can be read off at the graduated drum 14.

For the use of the device, after clamping by means of the screw 15, by operation of the fine adjusting means 16 the angle of direction actually measured is directly determined, and, using the microscope 19 and the scale of length on the slide 8, this slide 8 is moved on the carrier 4, with the aid of the adjusting wheels 9, and directly set to the polar distance between the points actually measured.

Thus the precision protractor reproduces the angle of direction actually measured, while the precision length gauge reproduces the polar distance in one plane actually measured. The projected optical centre P of the screw microscope 12 on the network of coordinates occupies a position analogous to that of the polygon point actually measured.

In place of the microscopes 18, 18', and 19 there may be used other reading-off devices, such as for example magnifying glasses, and also generating wheels coacting with counting mechanism. The readings can also be brought together in the form of separate images at desired points, by means of optical or mechanical elements. The longitudinal and angular adjustment may also be effected by means of any other suitable precision adjusting devices, with or without graduation marks or scales, (for example spindles). The screw microscope 12 may also be replaced by other devices having optically or mechanically movable marks or lines for the reduction of lengths (e. g. a screw microscope with two or more marks or lines) or by contrivances with marks or lines (e. g. estimating microscopes), or by devices which establish coincidence between graduation marks of length or which denote the direction at right angles or perpendicular to a scale (e. g. microscopes with centre marks or lines). The screw microscope 12 may also be mounted on a slide capable of being swivelled and adjusted from the carrier 4.

The angle indicator of the apparatus may be so equipped with angle repetition of the type known, for example, in repetition theodolites and precision double image tachometers, or for instance with a rotatable and adjustable dial, that the point at which reading-off is effected is independent of the angular adjustment, but can be shifted to any desired point and adjusted to any desired angular value. Finally, the apparatus may also be utilized for determining other values, e. g. zenith distances, points of intersection, or angles of direction and distances, from coordinate differences. Where necessary, the apparatus is provided with rectifying means (e. g. the screws 7 and c in Figs. 1–3).

It will be clear that, at the cost of sacrificing the technical advantages accruing from reproduction of actually measured data, the apparatus according to the invention may also be so designed as to be suitable for use with quadrants or octants.

We claim:

Apparatus of the character described comprising: a support, a pivot extending substantially vertically from said support, a circular plate fixed on said support and having its center coincident with the axis of said pivot, a second circular plate slidably and rotatably mounted on the first named plate and having a network of rectangular coordinates and angular graduations marked thereon, means for adjusting and holding said second plate in predetermined position of the first named plate, a carrier rotatable on said pivot, means for clamping said carrier to said pivot, said carrier including a substantially rectangular frame rotatable about said axis and extending diametrically across the graduated surface of the second plate, a graduated member slidable in said frame diametrically across said second plate, means for sliding said member on said frame, and on said member to determine the angular position of said frame relative to the said angular graduations and of the said member relative to said axis.

HUGO BOHRN.
LEANDER AVANZINI.